United States Patent
Kim (10) Patent No.: US 8,280,676 B2
(45) Date of Patent: Oct. 2, 2012

(54) SENSING SYSTEM FOR RECOGNITION OF DIRECTION OF MOVING BODY

(75) Inventor: Hyo-Goo Kim, Daejeon (KR)

(73) Assignee: Hyo-Goo Kim (KR)

( * ) Notice: Subject to any disclaimer, the term of this patent is extended or adjusted under 35 U.S.C. 154(b) by 669 days.

(21) Appl. No.: 11/916,422

(22) PCT Filed: Jun. 2, 2006

(86) PCT No.: PCT/KR2006/002142
§ 371 (c)(1),
(2), (4) Date: Apr. 15, 2010

(87) PCT Pub. No.: WO2006/129989
PCT Pub. Date: Dec. 7, 2006

(65) Prior Publication Data
US 2011/0172953 A1    Jul. 14, 2011

(30) Foreign Application Priority Data
Jun. 2, 2005  (KR) .................. 10-2005-0047370
Jun. 2, 2006  (KR) .................. 10-2006-0050049

(51) Int. Cl.
*G01C 19/00*    (2006.01)

(52) U.S. Cl. .............. 702/150; 340/568.1; 340/568.8; 348/143; 348/77

(58) Field of Classification Search .......... 702/150; 340/568.1, 568.8; 348/143, 77
See application file for complete search history.

(56) References Cited

U.S. PATENT DOCUMENTS

| 7,868,912 | B2 * | 1/2011 | Venetianer et al. | 348/143 |
| 2005/0162515 | A1 * | 7/2005 | Venetianer et al. | 348/143 |
| 2005/0169367 | A1 * | 8/2005 | Venetianer et al. | 375/240.01 |
| 2006/0262187 | A1 * | 11/2006 | Takizawa | 348/77 |
| 2007/0013776 | A1 * | 1/2007 | Venetianer et al. | 348/143 |
| 2007/0076843 | A1 * | 4/2007 | Matsumoto | 378/34 |
| 2008/0083888 | A1 * | 4/2008 | Sugimoto | 250/580 |
| 2008/0100704 | A1 * | 5/2008 | Venetianer et al. | 348/143 |

FOREIGN PATENT DOCUMENTS

JP    6-194376    7/1994

(Continued)

OTHER PUBLICATIONS

International Search Report for International Application No. PCT/KR2006/002142; mailed date Oct. 12, 2006.

*Primary Examiner* — Carol Tsai
(74) *Attorney, Agent, or Firm* — Cantor Colburn LLP (57) ABSTRACT

An apparatus for recognizing an entry/exit direction of a moving body includes a first moving body detection sensor; a second moving body detection sensor; and a control means connected to the first and second moving body detection sensors by wire/wireless to recognize as an entry of a moving body only when, after moving body detection signals of the first and second moving body detection sensors are received simultaneously or together for a first predetermined time, the moving body detection signal of the second moving body detection sensor is not lastly received, and to recognize as an exit of a moving body only when, after moving body detection signals of the first and second moving body detection sensors are received simultaneously or together for a first predetermined time, the moving body detection signal of the first moving body detection sensor is not lastly received.

45 Claims, 4 Drawing Sheets

FOREIGN PATENT DOCUMENTS

| | | |
|---|---|---|
| JP | 1997062954 | 3/1997 |
| JP | 10-334711 | 12/1998 |
| JP | 2002-50489 | 2/2002 |
| KR | 1996-0016640 | 5/1996 |
| KR | 10-2004-0075757 | 9/2004 |
| KR | 20040075757 A * | 6/2005 |

* cited by examiner

SENSING SYSTEM FOR RECOGNITION OF DIRECTION OF MOVING BODY

TECHNICAL FIELD

The present invention relates to an apparatus for recognizing an entry/exit direction of a moving body, and more particularly, to an apparatus for recognizing an entry/exit direction of a moving body, wherein an entry/exit direction of a moving body is recognized without an error according to a user's position displacement pattern, and operations of flickering of illumination, adjustment of illumination, setting/release of security and other electric devices in accordance with an entry/exit of the moving body in a specific object space are performed without additional switch handling so that user's convenience is improved, and a controlling method.

BACKGROUND ART

Figure 2:
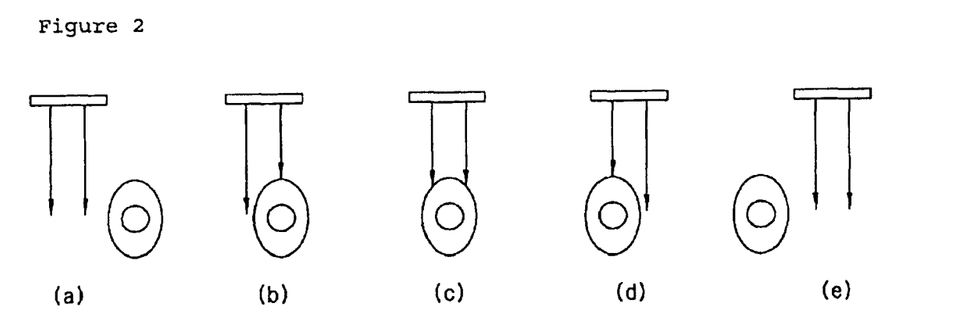
FIG. 2 is a schematic view illustrating a sensor detection by means of two sensors in accordance with a position of a moving body.
Figure 3:
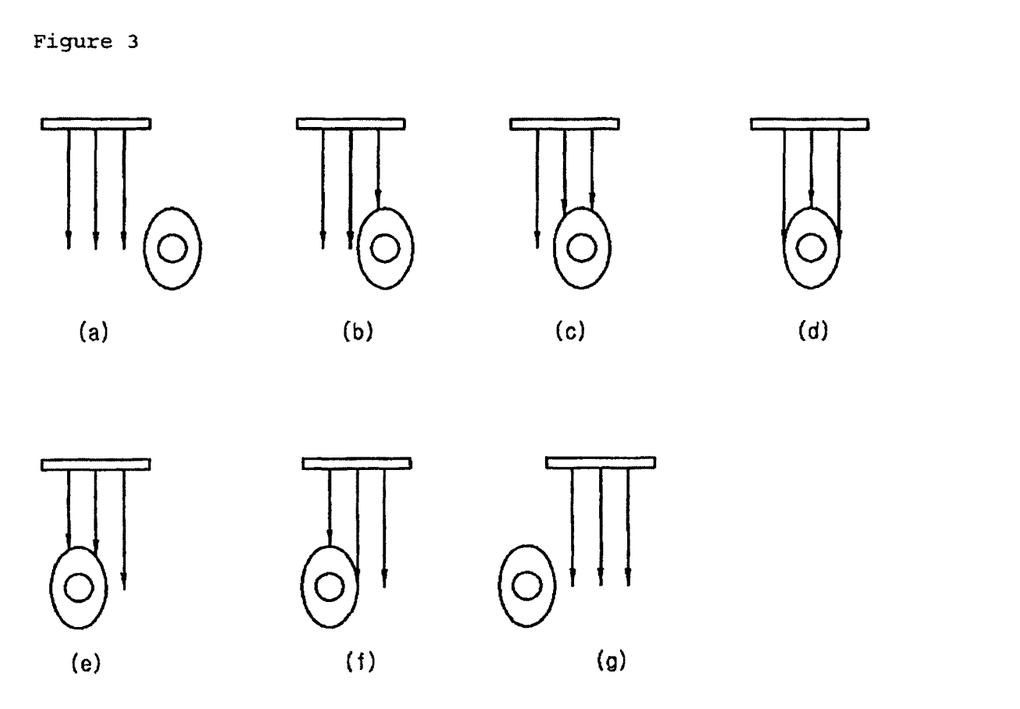
FIG. 3 is a schematic view illustrating a sensor detection by means of three sensors in accordance with a position of a moving body.

Recently, an interest in a field where an operation of an internal/external electric device or the like in the specific object space automatically controlled by recognizing a presence of entry/exit of a moving body such as a person or vehicle in a specific object space has become high. This has been recognized as a field where there will be shown many changes while combining with a control technique by means of radio such as bluetooth that has been recently developed. However, a method of recognizing a direction of a moving body is very complicated, and besides, there are many limitations in commercialization because numerous errors are generated in recognition. Consequently, there is no choice that a method of distinguishing between entry/exit gateways of a moving body is adopted as an alternative plan. However, since most entry/exit gateways are identical in cases where a space such as a lavatory or a conference room, or a gateway of a parking lot is narrow, entry/exit gateways should be simultaneously used and the like, this method cannot also be an alternative plan. Recently, the present inventors have invented and applied an automatic switch wherein moving body detection sensors are respectively provided at an entrance side and an inner portion of a specific object space to implement a lightening-on/off control in accordance with a user's entry/exit in the specific object space, i.e. an automatic lightening-on/off of a lightening lamp in accordance with an entry/exit detection and when detecting entry/entry completion/exit so that the lightening on/off of the lightening lamp can be automatically controlled in a user's position displacement, for Korean Paten Application No. 2004-75757. According to the application invention, there is provided a method wherein, in a case where a moving body passes through a sensor unit having a first moving body detecting sensor and a second moving body detecting sensor respectively positioned at outer and inner portion of a specific object space, a moving body entry is recognized in an order of recognition of the first moving body detecting sensor and then the second moving body detecting sensor when a moving body starts from a position of FIG. 2a being the outside of a recognition range of the first moving body detection sensor, is sequentially recognized by the first moving body detection sensor at a position of FIG. 2b and by the second moving body detection sensor at a position of FIG. 2d, and then reaches a position of FIG. 2e being the outside of the recognition ranges of the first and second moving body detection sensors; and counterwise, a moving body exit is recognized in an order of recognition of the second moving body detecting sensor and then the first moving body detecting sensor when the moving body moves in an order of FIGS. 2e, 2d and 2a. The applied invention has a problem in that there may occur a case where a hand of a person or clothes entering/exiting as shown in FIG. 3f is overlappingly detected by the first or second moving body detection sensor separately from a body of the person so that an error in an entry/exiting recognition of the person is generated.

DISCLOSURE

Technical Problem

The present invention is conceived to solve the aforementioned problems. Accordingly, it is an object of the present invention to provide an apparatus for recognizing an entry/exit direction of a moving body, wherein an detection error due to a hand of a person, clothes or the like is eliminated so that a presence of entry/exit can be recognized only when a plurality of moving body detection sensors pass through a specific detection step in accordance with an entry/exit recognition pattern of a moving body, thereby minimizing an error of an entry/exit recognition.

It is another object of the present invention to provide a switch through which various kinds of electric devices applied to a specific object space can be controlled by the apparatus for recognizing an entry/exit direction of a moving body in accordance with a result of a moving body entry/exit recognition.

Technical Solution

To achieve these objects of the present invention, there is provided an apparatus for recognizing an entry/exit direction of a moving body, comprising: a first moving body detection sensor positioned at an entrance side of a specific object space or a portion adjacent thereto; a second moving body detection sensor positioned in an inner side direction of the specific object space from a position where the first moving detection sensor is positioned; and a control means connected to the first and second moving body detection sensors by wire/wireless so as to recognize as an entry of a moving body only when, after moving body detection signals of the first and second moving body detection sensors are received simultaneously or together for a first predetermined time, the moving body detection signal of the second moving detection sensor is not lastly received, and to recognize as an exit of a moving body only when, after moving body detection signals of the first and second moving body detection sensors are received simultaneously or together for a first predetermined time, the moving body detection signal of the first moving detection sensor is not lastly received.

Further, the present invention provides an apparatus for recognizing an entry/exit direction of a moving body, comprising: a first moving body detection sensor positioned at an entrance side of a specific object space or a portion adjacent thereto; a second moving body detection sensor positioned in an inner side direction of the specific object space from a position where the first moving detection sensor is positioned; and a control means connected to the first and second moving body detection sensors by wire/wireless so as to recognize as an entry of a moving body only when, after moving body detection signals of the first and second moving body detection sensors are received simultaneously or together for a first predetermined time, the moving body detection signal of the first moving detection sensor is not received, and to recognize as an exit of a moving body only when, after moving body detection signals of the first and second moving body detection sensors are received simultaneously or together for a first predetermined time, the moving body detection signal of the second moving detection sensor is not received.

Furthermore, the present invention provides an apparatus for recognizing an entry/exit direction of a moving body, comprising: two or more moving body detection sensors arranged in parallel at an entrance side of a specific object space or a portion adjacent thereto; and a control means connected to the moving body detection sensors by wire/wireless so as to recognize as an entry of a moving body when a moving body detection signals are received together from two or more of the moving body detection sensors simultaneously or within a first predetermined time, and a moving body detection signal is not received from the moving body detection sensor positioned at the outermost side of the specific object space among the plurality of moving body detection sensors, or to recognize as an exit of a moving body when a moving body detection signal is not lastly received from the moving body detection sensor positioned at the outermost side of the specific object space.

Meanwhile, the present invention provides a method of controlling an apparatus for recognizing an entry/exit direction of a moving body, comprising the following steps: i) allowing a control means to receive moving body detection signals of a first moving body detection sensor positioned at an entrance side of a specific object space or a portion adjacent thereto and a second moving body detection sensor positioned in an inner side direction at an inner side of the first moving body detection sensor simultaneously or together for a first predetermined time; ii) allowing the control means to recognize as an entry of a moving body when the moving body detection signal of the second moving body detection sensor is not lastly received by the control means; iii) allowing the control means to receive the moving body detection signals of the first and second moving body sensors simultaneously or together within the first predetermined time; and iv) allowing the control means to recognize as an exit of a moving body when the moving body detection signal of the first moving body detection sensor is not lastly received by the control means.

Further, the present invention provides a method of controlling an apparatus for recognizing an entry/exit direction of a moving body, comprising the following steps: i) allowing a control means to receive moving body detection signals of a first moving body detection sensor positioned at an entrance side of a specific object space or a portion adjacent thereto and a second moving body detection sensor positioned in an inner side direction at an inner side of the first moving body detection sensor simultaneously or together for a first predetermined time; ii) allowing the control means to recognize as an entry of a moving body when the moving body detection signal of the first moving body detection sensor is not received by the control means; iii) allowing the control means to receive the moving body detection signals of the first and second moving body sensors simultaneously or together within the first predetermined time; and iv) allowing the control means to recognize as an exit of a moving body when the moving body detection signal of the second moving body detection sensor is not received by the control means.

Furthermore, the present invention provides a method of controlling an apparatus for recognizing an entry/exit direction of a moving body, comprising the following steps: i) allowing a control means to receive moving body detection signals of a first moving body detection sensor positioned at an entrance side of a specific object space or a portion adjacent thereto and a second moving body detection sensor positioned in an inner side direction at an inner side of the first moving body detection sensor simultaneously or together for a first predetermined time; ii) allowing the control means to recognize as an entry of a moving body when the moving body detection signal of the first moving body detection sensor is not received and the moving body detection signal of the second moving body detection sensor is not then received again by the control means; iii) allowing the control means to receive the moving body detection signals of the first and second moving body sensors simultaneously or together within the first predetermined time; and iv) allowing the control means to recognize as an exit of a moving body when the moving body detection signal of the second moving body detection sensor is not received and the moving body detection signal of the first moving body detection sensor is not then received again by the control means.

Advantageous Effects

According to the present invention, there is an advantage in that an detection error of a moving body is eliminated so that a presence of entry/exit can be recognized only when a plurality of moving body detection sensors pass through a specific detection step in accordance with an entry/exit recognition pattern of the moving body, and various kinds of electric devices applied to a specific object space can be controlled by the apparatus for recognizing an entry/exit direction of a moving body in accordance with a result of a moving body entry/exit recognition.

DESCRIPTION OF DRAWINGS

The above and other objects, features and advantages of the present invention will become apparent from the following description of preferred embodiments given in conjunction with the accompanying drawings, in which.

DETAILED DESCRIPTIONS OF THE REFERENCE NUMERALS

100: Control means
200: Moving body detection sensor unit
210: First moving body detection sensor
220: Second moving body detection sensor
300: Manual switch

BEST MODE

Hereinafter, the embodiments of the present invention will be described in detail with reference to accompanying drawings.

Figure 1:
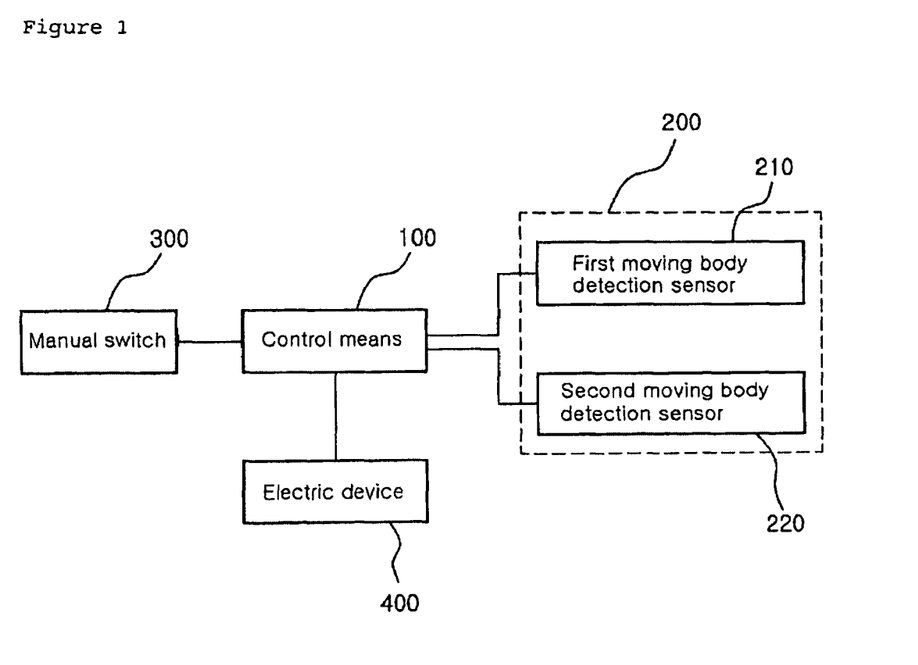
FIG. 1 is a system block diagram of an apparatus for recognizing an entry/exit direction of a moving body according to the present invention.
Figure 4:
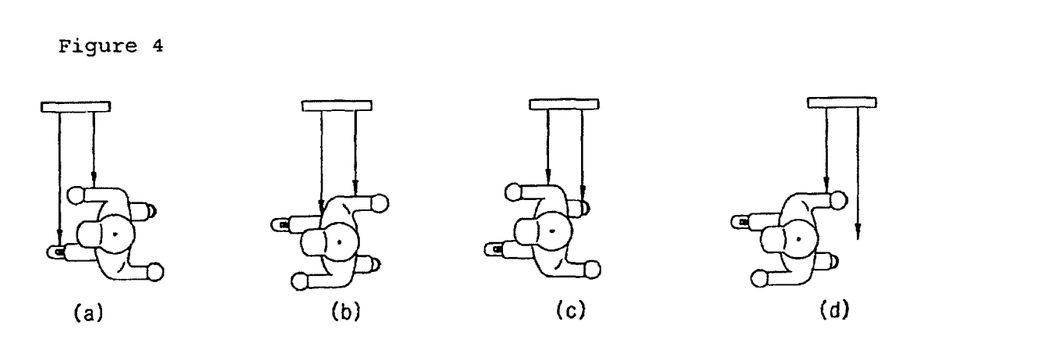
FIG. 4 is a schematic view illustrating a detection of a sensor in a moving body overlapping detection form.
Figure 5:
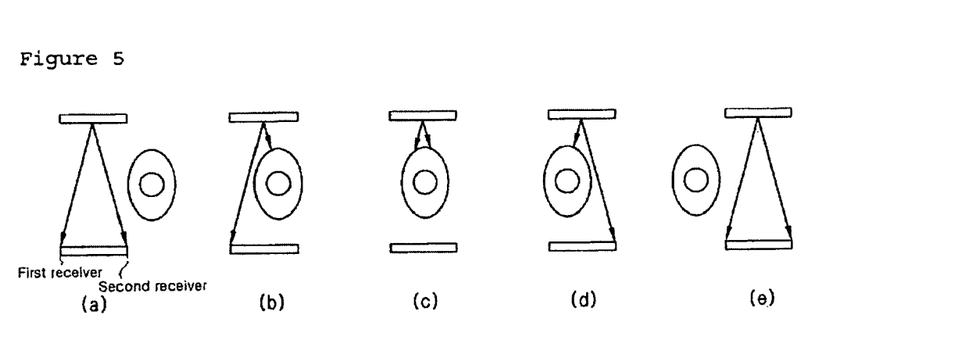
FIG. 5 is an embodiment of a schematic view illustrating a detection using a single sensor.
Figures 6, 7:
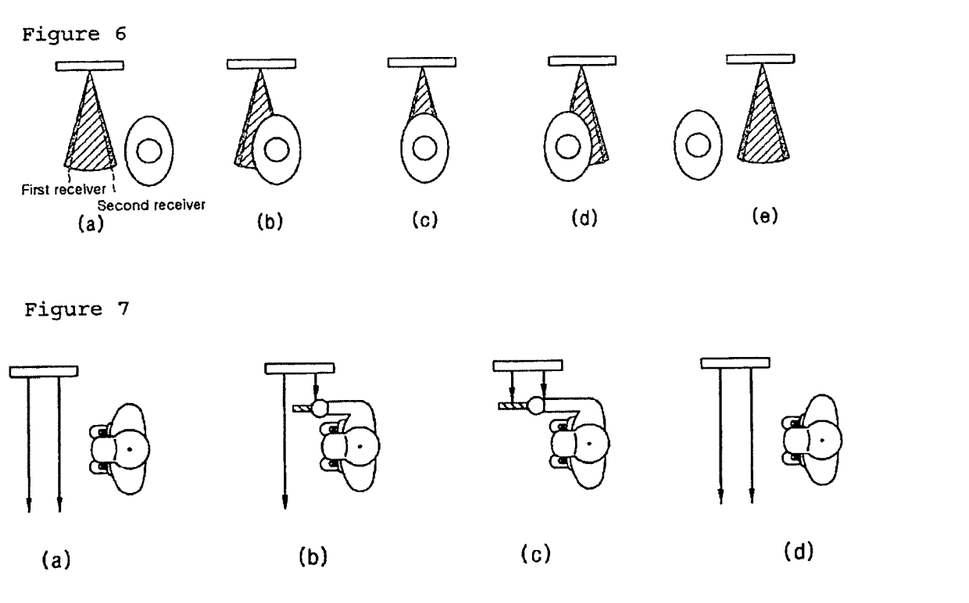
FIG. 6 is another embodiment of the schematic view illustrating a detection using the single sensor.
FIG. 7 is an embodiment of a schematic view illustrating a detection for noise removal.
Figure 8:
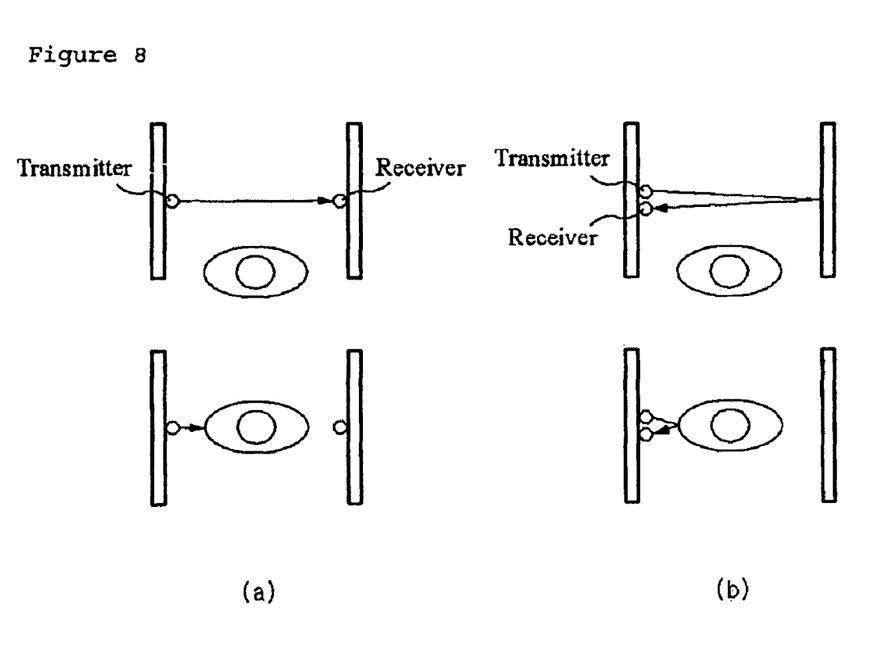
FIG. 8 is a schematic view illustrating a detection depending on a kind of sensor.

FIG. 1 is a system block diagram of an apparatus for recognizing an entry/exit direction of a moving body according to the present invention, FIG. 2 is a schematic view illustrating a sensor detection by means of two sensors in accordance with a position of a moving body, FIG. 3 is a schematic view illustrating a sensor detection by means of three sensors in accordance with a position of a moving body, and FIG. 4 is a schematic view illustrating a detection of a sensor in a moving body overlapping detection form. Further, FIGS. 5 and 6 are two embodiments of a schematic view illustrating a detection using a single sensor, and FIG. 7 is an embodiment of a schematic view illustrating a detection for noise removal. Furthermore, FIG. 8 is a schematic view illustrating a detection depending on a kind of sensor.

Referring to FIG. 1, the apparatus for recognizing an entry/exit direction of a moving body according to the present invention comprises a moving body detection sensor unit 200 having first and second moving body detection sensors 210 and 220 and a control means 100 respectively connected by wire/wireless thereto. The control means 100 is also connected to an electric device 400 arranged and configured at inner and outer portions of a specific object space.

In the present invention, in a case where a moving body passes through the first moving body detection sensor provided at an external side of a specific object space and the second moving body detection sensor positioned at an internal side of the specific object space, when the moving body starts at a position of FIG. 2a that is the outside of a detection range of the first moving body detection sensor and then enters inside the specific object space (FIG. 2a), the control means recognizes as an entry of the moving body only when moving body detection signals of the first and second moving body detection sensors are received simultaneously or together for a first predetermined time (FIG. 2c) and the moving body signal of the second moving body detection sensor is not then received lastly (FIG. 2e); and counterwise, when the moving body starts at the inside of the specific object space that is the outside of a detection range of the second moving body detection sensor (FIG. 2e) and then exits to the outside (FIG. 2a), the control means recognizes as an exit of the moving body only when, as shown in FIG. 2c, moving body detection signals of the first and second moving body detection sensors are received simultaneously or together for a first predetermined time (FIG. 2c) and the moving body signal of the first moving body detection sensor is not then received lastly (FIG. 2a). Accordingly, a noise signal overlappingly detected from a hand of a person, clothes or the like is eliminated so that an error of entry/exit recognition of the moving body is minimized as shown in FIG. 4.

Preferably, the control means recognizes as an entry of a moving body only when, after moving body detection signals of the first and second moving body detection sensors are received simultaneously or within a first predetermined time (FIG. 2c), the moving body detection signal of the first moving body detection sensor is not received (FIG. 2d) and the moving body detection signal of the second moving body detection sensor is not then received lastly (FIG. 2e); and recognizes as an exit of a moving body only when, after moving body detection signals of the first and second moving body detection sensors are received simultaneously or within a first predetermined time (FIG. 2c), the moving body detection signal of the second moving body detection sensor is not received (FIG. 2b) and the moving body detection signal of the first moving body detection sensor is not then received lastly (FIG. 2a).

The moving body detection sensor may be divided into various kinds, and largely divided into transparent and reflective types. FIGS. 8a and 8b show schematic views illustrating detections of the transparent and reflection type sensors, respectively. Since the transparent type sensor is provided such that a transmitter and a receiver face each other, a signal radiated from the transmitter is blocked by a moving body not to be transmitted to the receiver if the moving body enters between the transmitter and receiver so that the moving body is detected. On the other hand, the reflection type sensor is provided with a transmitter and a receiver at the same side, and a signal radiated from the transmitter is reflected on a wall or object to be transmitted to the receiver. Since in a case where the signal is reflected on the wall or reflected on a moving body because the moving body is interposed between the wall and the receiver, the moving body is detected through a method appropriately selected in accordance with a property of a used medium, such as a property change in the number of waves and the waveform of light, or a change in reflected and received location.

At this time, in a case where the moving body detection sensor is provided with a transmitter-receiver to transmit a specific signal (infrared light or the like) from the transmitter to the receiver (i.e., in a case of the transparent type sensor), "the reception of a moving body detection signal" means that a moving body is interposed between the transmitter and receiver so that the receiver does not receive the specific signal transmitted from the transmitter. It will be apparent that "the non-reception of a moving body detection signal" is an opposite case and means that there is no object interposed between the transmitter and receiver so that the receiver receives the specific signal transmitted from the transmitter. In the following description, the reception/non-reception of a moving body detection signal means the same as described above. It will be apparent that, in a case where the moving body detection sensor is not a moving body detection sensor (e.g., a moving body detection sensor informing that an object is detected when it exists within a specific distance, representatively a reflection type sensor) using a principle in which a moving body is detected when the moving body is interposed between the transmitter and receiver (i.e., when the moving body prevents communications between the transmitter and receiver) because the moving body detection sensor is provided the transmitter-receiver as described above, the reception/non-reception may be defined through an appropriate method in an operational principle of the correspondent moving body detection sensor.

Further, even if a single moving body detection sensor is used, the same effect as when the two moving body detection sensors shown in FIG. 2 are used may be obtained. As an example, first and second moving body detection sensors are formed in a single body such that two signals in one transmitter are transmitted while maintaining a fixed angle to each other and then respectively received by two receivers spaced apart from each other at a predetermined interval as shown in FIG. 5, so that the two signals can be first and second moving body detection signals, respectively. More specifically, the moving body detection sensor is controlled such that signals respectively received by first and second receivers among the two receivers shown in FIG. 5 are the first and second moving body detection signals, respectively.

FIG. 6 shows another example of using a single moving body detection sensor. In a case where the moving body detection sensor has a sensing range in the shape of a fan, first and second sensing ranges are set by setting a predetermined range as shown in this figure. The moving body detection sensor is controlled to recognize as first and second moving body detection signals in cases where a moving body entered the first and second sensing ranged, respectively.

As such, the present invention is implemented using two moving body detection sensors, and first/second receivers or first/second sensing ranges are appropriately predetermined even in a case where a single moving body detection sensor is used, so that the control method of the present invention can be implemented.

In another apparatus according to the present invention, in a case where a moving body passes through the first moving body detection sensor provided at an external side of the aforementioned specific object space and the second moving body detection sensor positioned at an internal side of the specific object space, although it is identical in that when the moving body starts at a position of FIG. 2a or 2e and then progresses at a position of FIG. 2e or 2a of the specific object space, moving body detection signals of the first and second moving body detection sensors are received simultaneously or together for a first predetermined time (FIG. 2c); the control means recognizes as an entry of the moving body not only when the moving body signal of the second moving body detection sensor is not lastly received (FIG. 2e) but only when the moving body moves at a position of FIG. 2c and the moving body signal of the first moving body detection sensor is not then received (FIG. 2a); and the control means recognizes as an exit of the moving body not only when the moving body signal of the first moving body detection sensor is not lastly received (FIG. 2a) but only when the moving body signal of the second moving body detection sensor is not received (FIG. 2e). Accordingly, a noise signal overlappingly detected from a hand of a person, clothes or the like is eliminated so that an error of entry/exit recognition of the moving body is minimized.

The case where moving body detection signals of the first and second moving body detection sensors are received simultaneously or together for a first predetermined time (FIG. 2c) means a case where a moving body is positioned within a simultaneous detection range of the first and second moving body detection sensor such that it is detected. To this end, it will be apparent that a distance between the first and second moving body detection sensors is set to mount within the maximum width of a moving body. That is, it will be apparent that in a case where a person is assumed as the moving body, the distance between the first and second moving body detection sensors is within the thickness of a belly or breast of the person, and in a case of a vehicle, it is within the minimum length thereof. In the case of a person, a mounting height of each of the first and the second moving body detection sensors is preferably 60 to 150 cm from a bottom, and the mounting heights of both the sensors are not necessarily identical with each other. It does not matter that the mounting heights of both the sensors are different from each other.

Although it may be set considering the movement of a moving body whether the moving body detection signals of the first and second moving body detection sensors are received simultaneously or within a predetermined time, it is preferably set to be 0 to 1 second considering a moving time of the mounting width of the sensors in the case of a person.

At this time, in a case where the apparatus described above is used when a person enters a specific object space, it is recognized as an entry after the person has completely passed therethrough. However, in a case where an electric device controlled by the control means is an electric lamp, since the electric lamp is not turned on until the person completely enters the specific object space (e.g., bathroom, rest room or the like), the person should enter the dark space after all so that psychological inconvenience may be induced to a user. Preferably, in order to prevent such a phenomenon, the control means first recognizes an arbitrary entry if a first moving body detection signal is detected, recognizes that a moving body has entered within a second predetermined time if a second moving detection signal is detected after the first moving detection signal has been detected, and recognizes that an entry of the moving body is not achieved unless the second moving body detection signal is detected within the second predetermined time, so that a state of the arbitrary entry becomes invalid. That is, in a case where the electric device controlled by the control means is an electric lamp as described above, the electric lamp is turned on immediately after the user passes through the first moving body detection sensor, and the electric lamp is again turned off unless the user passes through the second moving body detection sensor within the second predetermined time. In this case, the second predetermined time is preferably 5 seconds or more.

Further, in the apparatus for recognizing an entry/exit direction of a moving body according to the present invention as shown in FIG. 7, if time when the first and second moving body detection sensors simultaneously detect the moving body is within a third predetermined time, the control means preferably ignores this so as to eliminate noises generated in a case where the user does not enter or exit but a user's hand slightly goes past by the moving body detection sensor. That is, since a person has a volume itself in a case where the person passes through the recognizing apparatus, there is a limit even though the person passes therethrough as fast as possible. However, in a case where a user's hand slightly goes past by the moving body detection sensor, it is possible to pass through the first and second moving body detection sensors within time much faster than time when the person completely passes therethrough. Thus, if time when a moving body is detected simultaneously by the first and second moving body detection sensors is within the third predetermined time, it is recognized that the person does not pass through the recognizing apparatus but user's hand or another object passes therethrough, so that noises due to a movement of the hand or the like can be remarkably eliminated. In this case, the third predetermined time is preferably 0.5 second or less.

Although, the noise is eliminated by ignoring a signal if the moving body is detected simultaneously by the first and second moving body detection sensors within the third predetermined time (0.5 second) after the moving body has been detected by the first moving body detection sensor in the aforementioned embodiment, another method for eliminating the noise may be used. If the moving body is detected by the second moving body detection sensor after it has been detected by the first moving body detection sensor, the control means recognizes this as an entry, and if the moving body is detected by the first moving body detection sensor after it has been detected by the second moving body detection sensor, the control means recognizes this as an exit. However, if such entry and exit occur at a very fast interval, the control means does not recognize this. That is, since a person has a limit in person's volume and an exercisable speed, if the moving body enters/exits within a fourth predetermined time, the control means recognizes this as an object (a hand, another object or the like) smaller than the person to ignore it, so that the noises can be eliminated. In this case, it is preferred that the fourth predetermined time be within 0.5 second.

The first and second moving body detection sensors constituting the moving body detection sensor unit 200 may employ any sensor capable of detecting a moving body including an optical sensor provided together with transmitting and receiving units, a supersonic sensor, a proximity sensor and an optical sensor provided with light transmitting and receiving units.

In the apparatus for recognizing an entry/exit direction of a moving body according to the present invention, wherein the control means operates and processes by +1 whenever an entry of a moving body is recognized and by −1 whenever an exit of a moving body is recognized to recognize the number of remaining moving bodies within the specific object space such that the number of remaining bodies within a specific object space is recognized although the moving bodies enter/exit within the specific object space in a random order. Further, the apparatus for recognizing an entry/exit direction of a moving body further includes a function of supplying, cutting off an electric power of an electric device or adjusting an amount of a current in accordance with a presence of entry/exit of the moving body or a specific operation result. That is, in a case where a moving body does not completely exit within a specific object space such as a public lavatory, i.e., in a case of an operation result is 0 (since a case where the operation result is less than 0 is a detection error, the control means preferably recognizes a numeral less than 0 being an operation result of a switch as 0), a configuration in which electric power supply to an electric lamp is cut off to light off or an amount of a current is adjusted to make luminosity of the electric lamp darker than that of a normal electric lamp is added so that it can be applied to an electric lamp switch for saving electricity.

Further, the control means is electrically connected to one or more selected from a digital or analog output device for displaying the number of remaining moving bodies within the specific object space and a manual switch for supplying or cutting off electric power of an electric device.

Furthermore, the control means can be combined with a home network system including MICOM and particularly, employed in environment using a bluetooth or the like. Moreover, the control means can be used to combine with other devices for automatically setting whether or not to operate a security device in accordance with a presence of a person inside a specific object space, and the like. For example, the control means is provided in a bathroom to turn on an electric lamp when a user enters and to turn off the electric lamp while operating an automatic locking device separately provided to water supply when the user exits, so that the water supply can be automatically turned off even though the user does not turn off the water supply by slipping user's mind for the moment. Further, the control means is connected or attached to an electric device such as an audio system, a radio or an LCD TV, so that it can be automatically turned on or off as the user enters or exits a specific object space in which the electric device is provided. Particularly, in this case, the control means may be provided separately from the electric device or integrally provided with the electric device.

Moreover, in a case where a plurality of doors are formed in a specific object space, it is preferred that a sensing unit having moving body detection sensors be provided to the respected doors, and a single control means be connected to the plurality of sensing units at a time so as to integrally recognize an entry/exit and control an electric device as described above.

An apparatus for recognizing an entry/exit direction of a moving body according to the present invention may operates two or more moving body detection sensors. The apparatus for recognizing an entry/exit direction of a moving body operating the two or more moving body detection sensors, comprising: two or more moving body detection sensors arranged in parallel at an entrance side of a specific object space or a portion adjacent thereto; and a control means connected to the moving body detection sensors by wire/wireless so as to recognize as an entry of a moving body when a moving body detection signals are received together from two or more of the moving body detection sensors simultaneously or within a first predetermined time, and a moving body detection signal is not received from the moving body detection sensor positioned at the outermost side of the specific object space among the plurality of moving body detection sensors, or to recognize as an exit of a moving body when a moving body detection signal is not lastly received from the moving body detection sensor positioned at the outermost side of the specific object space.

The number of the moving body detection sensors may be two or more, preferably, 2 to 4. The position of the moving body of which moving body detection signals are received simultaneously or within a first predetermined time includes all the forms of FIGS. 3c, 3d and 3e in a case where the moving body detection sensors are operated as three sensors. When a moving body detection signal is not lastly received from the moving body detection sensor positioned at the innermost side of the specific object space among the plurality of moving body detection sensors is a time point where the position of the moving body moves to FIG. 3g after the moving body is detected at a position of FIG. 3f; and when a moving body detection signal is not received from the moving body detection sensor positioned at the outermost side of the specific object space among the plurality of moving body detection sensors is a time point where the position of the moving body moves to FIG. 3e after the moving body is detected at a position of FIG. 3c or 3d.

The width at which the two or more moving body detection sensors are positioned is preferably within the width of a possible moving body, i.e., within the thickness of a belly or breast in a case of a person.

Preferably, a method of controlling the apparatus for recognizing an entry/exit direction of a moving body provided with the aforementioned structural characteristic, comprising the following steps: i) allowing a control means to receive moving body detection signals of a first moving body detection sensor positioned at an entrance side of a specific object space or a portion adjacent thereto and a second moving body detection sensor positioned in an inner side direction at an inner side of the first moving body detection sensor simultaneously or together for a first predetermined time; ii) allowing the control means to recognize as an entry of a moving body when the moving body detection signal of the first moving body detection sensor is not received and the moving body detection signal of the second moving body detection sensor is not then received again by the control means; iii) allowing the control means to receive the moving body detection signals of the first and second moving body sensors simultaneously or together within the first predetermined time; and iv) allowing the control means to recognize as an exit of a moving body when the moving body detection signal of the second moving body detection sensor is not received and the moving body detection signal of the first moving body detection sensor is not then received again by the control means.

Further, it is preferred that the electric device positioned at inner and outer portions of the specific object space is controlled on the basis of a result of entry/exit recognition of a moving body according to the controlling method. The method of controlling the apparatus for recognizing an entry/exit direction of a moving body according to the present invention can control the electric device by operating and processing by +1 whenever the moving body signals passing through the steps i) and ii) are received; operating and processing by −1 whenever the moving body signals passing through the steps iii) and iv) are received; and controlling to reduce illumination of an illumination lamp or the like positioned inside the specific object space or automatically light off whenever the operation processed result becomes 0. Further, in the controlling method according to the present invention, it is also within the scope of the present invention that an entry/exit direction of a vehicle is recognized and the number of vehicles are grasped within the parking lot so that a method of installing an electric device is combined on the basis of a result.

Furthermore, if the apparatus for recognizing an entry/exit direction of a moving body and the controlling method according to the present invention are used, various kinds of devices for detecting an entry/exit of a person to control a predetermined operation, i.e., a security system, a cooling/heating system, an air-conditioning system and an electric device such as an operation control system of appliances can be combined and controlled, and the devices can be combined through not only a wire but also a wireless technique using a bluetooth or the like.

INDUSTRIAL APPLICABILITY

As described above, according to the present invention, there is an advantage in that an detection error of a moving body is eliminated so that a presence of entry/exit can be recognized only when a plurality of moving body detection sensors pass through a specific detection step in accordance with an entry/exit recognition pattern of the moving body, and various kinds of electric devices applied to a specific object space can be controlled by the apparatus for recognizing an entry/exit direction of a moving body in accordance with a result of a moving body entry/exit recognition.

Those skilled in the art will appreciate that the conceptions and specific embodiments disclosed in the foregoing description may be readily utilized as a basis for modifying or designing other embodiments for carrying out the same purposes of the present invention. Those skilled in the art will also appreciate that such equivalent embodiments do not depart from the spirit and scope of the invention as set forth in the appended claims.

The invention claimed is:

1. An apparatus for recognizing an entry/exit direction of a moving body, comprising:
    a first moving body detection sensor positioned at an entrance side of a specific object space or a portion adjacent thereto;
    a second moving body detection sensor positioned in an inner side direction of the specific object space from a position where the first moving body detection sensor is positioned; and
    a control means connected to the first and second moving body detection sensors by wire/wireless so as to recognize as an entry of a moving body only when, after moving body detection signals of the first and second moving body detection sensors are received simultaneously or together for a first predetermined time, the moving body detection signal of the second moving body detection sensor is not lastly received, and to recognize as an exit of a moving body only when, after moving body detection signals of the first and second moving body detection sensors are received simultaneously or together for a first predetermined time, the moving body detection signal of the first moving body detection sensor is not lastly received.

2. The apparatus as set forth in claim 1, comprising a control means recognizing as an entry of a moving body only when, after moving body detection signals of the first and second moving body detection sensors are received simultaneously or together within a first predetermined time, the moving body detection signal of the first moving body detection sensor is not received and the moving body detection signal of the second moving body detection sensor is not then received, and recognizing as an exit of a moving body only when, after moving body detection signals of the first and second moving body detection sensors are received simultaneously or together for a first predetermined time, the moving body detection signal of the second moving body detection sensor is not received and the moving body detection signal of the first moving body detection sensor is not then received.

3. The apparatus as set forth in claim 2, wherein the first predetermined time is 0 to 1 second.

4. The apparatus as set forth in claim 2, wherein the control means recognizes as an arbitrary entry if a moving body detection signal of the first moving body detection sensor is received, and recognizes that the moving body does not enter unless a moving body detection signal of the second moving body detection sensor is received within a second predetermined time after the moving body detection signal of the first moving body detection sensor has been received.

5. The apparatus as set forth in claim 4, wherein the second predetermined time is 5 seconds or more.

6. The apparatus as set forth in claim 2, wherein the control means ignores the moving detection signal if time when moving body detection signals of the first and second moving body detection sensors are simultaneously received is within a third predetermined time.

7. The apparatus as set forth in claim 6, wherein the third predetermined time is 0.5 second or less.

8. The apparatus as set forth in claim 2, wherein the control means recognizes that the moving body does not enter if moving body detection signal of the first moving body detection sensor is received after a moving body detection signal of the second moving body detection sensor within a fourth predetermined time since a moving body detection signal of the second moving body detection sensor was received after a moving body detection signal of the first moving body detection sensor had been received.

9. The apparatus as set forth in claim 4, wherein the fourth predetermined time is within 0.5 second.

10. The apparatus as set forth in claim 1, wherein the control means operates and processes by +1 whenever an entry of a moving body is recognized, and operates and processes by −1 whenever an exit of a moving body is recognized so as to recognize the number of remaining moving bodies within the specific object space.

11. The apparatus as set forth in claim 10, wherein each of the first and second moving body detection sensors is an optical sensor provided together with transmitting and receiving units, an supersonic sensor or a proximity sensor.

12. The apparatus as set forth in claim 11, wherein the first and second moving body detection sensors are formed in a single body to have one transmitter and two receivers spaced apart from each other at a predetermined interval, and signals respectively received by the two receivers become moving body detection signals of the first and second moving body detection sensors.

13. The apparatus as set forth in claim 11, wherein the first and second moving body detection sensors are formed in a single body to have a sensing range with an apex in a transmitter and two receivers spaced apart from each other within the sensing range, and the control means recognizes as a moving body detection signal of the first moving body detection sensor if a moving body is detected by a first receiver among the two receivers and recognizes as a moving body detection signal of the second moving body detection sensor if the moving body is detected by a second receiver.

14. The apparatus as set forth in claim 10, wherein the control means further includes a function of supplying, cutting off an electric power of an electric device or adjusting an amount of a current in accordance with a presence of entry/exit of a moving body or a specific operation result.

15. The apparatus as set forth in claim 14, wherein the control means is electrically connected to one or more selected from an output device for displaying the number of remaining moving bodies within the specific object space and a manual switch for supplying or cutting off electric power of an electric device.

16. The apparatus as set forth in claim 14, wherein the control means is integrally provided in the electric device provided in a specific object space.

17. The apparatus as set forth in claim 14, wherein the control means is connected to a plurality of sensor sets each having the first and second moving body detection sensors so as to integrally control the plurality of sensor sets.

18. A method of controlling an apparatus for recognizing an entry/exit direction of a moving body, comprising the following steps:
   i) allowing a control means to receive moving body detection signals of a first moving body detection sensor positioned at an entrance side of a specific object space or a portion adjacent thereto and a second moving body detection sensor positioned in an inner side direction at an inner side of the first moving body detection sensor simultaneously or together for a first predetermined time;
   ii) allowing the control means to recognize as an entry of a moving body when the moving body detection signal of the second moving body detection sensor is not lastly received by the control means;
   iii) allowing the control means to receive the moving body detection signals of the first and second moving body sensors simultaneously or together within the first predetermined time; and
   iv) allowing the control means to recognize as an exit of a moving body when the moving body detection signal of the first moving body detection sensor is not lastly received by the control means.

19. The method as set forth in claim 18, comprising the following steps:
   i) allowing a control means to receive moving body detection signals of a first moving body detection sensor positioned at an entrance side of a specific object space or a portion adjacent thereto and a second moving body detection sensor positioned in an inner side direction at an inner side of the first moving body detection sensor simultaneously or together for a first predetermined time;
   ii) allowing the control means to recognize as an entry of a moving body when the moving body detection signal of the second moving body detection sensor is not received again after the moving body detection signal of the first moving body detection sensor has not been received;
   iii) allowing the control means to receive the moving body detection signals of the first and second moving body sensors simultaneously or together within the first predetermined time; and
   iv) allowing the control means to recognize as an exit of a moving body when the moving body detection signal of the first moving body detection sensor is not received again after the moving body detection signal of the second moving body detection sensor has not been received.

20. The method as set forth in claim 19, wherein the first predetermined time is 0 to 1 second.

21. The method as set forth in claim 19, wherein the control means recognizes as an arbitrary entry if a moving body detection signal of the first moving body detection sensor is received, and recognizes that the moving body does not enter unless a moving body detection signal of the second moving body detection sensor is received within a second predetermined time after the moving body detection signal of the first moving body detection sensor has been received.

22. The method as set forth in claim 21, wherein the second predetermined time is 5 seconds or more.

23. The method as set forth in claim 19, wherein the control means ignores the moving detection signal if time when moving body detection signals of the first and second moving body detection sensors are simultaneously received is within a third predetermined time.

24. The method as set forth in claim 23, wherein the third predetermined time is 0.5 second or less.

25. The method as set forth in claim 19, wherein the control means recognizes that the moving body does not enter if moving body detection signal of the first moving body detection sensor is received after a moving body detection signal of the second moving body detection sensor within a fourth predetermined time since a moving body detection signal of the second moving body detection sensor was received after a moving body detection signal of the first moving body detection sensor had been received.

26. The method as set forth in claim 25, wherein the fourth predetermined time is within 0.5 second.

27. The method as set forth in claim 18, wherein the control means operates and processes by +1 whenever an entry of a moving body is recognized in the step ii), and operates and processes by −1 whenever an exit of a moving body is recognized to recognize the number of remaining moving bodies within the specific object space in the step iv).

28. The method as set forth in claim 27, wherein the first and second moving body detection sensors are formed in a single body to have one transmitter and two receivers spaced apart from each other at a predetermined interval, and signals respectively received by the two receivers become moving body detection signals of the first and second moving body detection sensors.

29. The method as set forth in claim 27, wherein the first and second moving body detection sensors are formed in a single body to have a sensing range with an apex in a transmitter and two receivers spaced apart from each other within the sensing range, and the control means recognizes as a moving body detection signal of the first moving body detection sensor if a moving body is detected by a first receiver among the two receivers and recognizes as a moving body detection signal of the second moving body detection sensor if the moving body is detected by a second receiver.

30. The method as set forth in claim 27, wherein the control means includes a function of supplying or cutting off electric power of an electric device or adjusting an amount of a current in accordance with a presence of entry/exit of a moving body in the step ii) or iv), or a specific operation result.

31. The method as set forth in claim 29, wherein the control means further includes a step of displaying the number of remaining bodies within the specific object space in accordance with an operation result.

32. The method as set forth in claim 30, wherein the control means is connected to a plurality of sensor sets each having the first and second moving body detection sensors so as to integrally control the plurality of sensor sets.

33. An apparatus for recognizing an entry/exit direction of a moving body, comprising:
   two or more moving body detection sensors arranged in parallel at an entrance side of a specific object space or a portion adjacent thereto; and
   a control means connected to the moving body detection sensors by wire/wireless so as to recognize as an entry of a moving body when a moving body detection signals are received together from two or more of the moving body detection sensors simultaneously or within a first predetermined time, and a moving body detection signal is not received from the moving body detection sensor positioned at the outermost side of the specific object space among the plurality of moving body detection sensors,
   or to recognize as an entry of a moving body when a moving body detection signal is not received lastly from the moving body detection sensor positioned at the outermost side of the specific object space.

34. The apparatus as set forth in claim 33, wherein the first predetermined time is 0 to 1 second.

35. The apparatus as set forth in claim 33, wherein the control means recognizes as an arbitrary entry if a moving body detection signal of the outermost moving body detection sensor among the plurality of moving body detection sensors is received, and recognizes that the moving body does not enter unless a moving body detection signal of the innermost moving body detection sensor is received within a second predetermined time after the moving body detection signal of the outermost moving body detection sensor has been received.

36. The apparatus as set forth in claim 35, wherein the second predetermined time is 5 seconds or more.

37. The apparatus as set forth in claim 33, wherein the control means ignores the moving detection signal if time when moving body detection signals of the plurality of moving body detection sensors are simultaneously received is within a third predetermined time.

38. The apparatus as set forth in claim 37, wherein the third predetermined time is 0.5 second or less.

39. The apparatus as set forth in claim 33, wherein the control means recognizes that the moving body does not enter if moving body detection signal of the outermost moving body detection sensor is received after a moving body detection signal of the innermost moving body detection sensor within a fourth predetermined time since a moving body detection signal of the innermost moving body detection sensor was received after a moving body detection signal of the outermost moving body detection sensor among the plurality of moving body detection sensors had been received.

40. The apparatus as set forth in claim 39, wherein the fourth predetermined time is within 0.5 second.

41. The apparatus as set forth in claim 33, wherein the control means operates and processes by +1 whenever an entry of a moving body is recognized in the step ii), and operates and processes by −1 whenever an exit of a moving body is recognized to recognize the number of remaining moving bodies within the specific object space in the step iv).

42. The apparatus as set forth in claim 41, wherein the plurality of moving body detection sensors are formed in a single body to have one transmitter and plurality of receivers spaced apart from one another at a predetermined interval, and signals respectively received by the plurality of receivers become moving body detection signals of the plurality of moving body detection sensors.

43. The apparatus as set forth in claim 41, wherein the plurality moving body detection sensors are formed in a single body to have a sensing range with an apex in a transmitter and a plurality of receivers spaced apart from one another within the sensing range, and the control means recognizes as a moving body detection signal of the correspondent moving body detection sensor among the plurality of moving body detection sensors if a moving body is detected by a specific receiver among the plurality of receivers.

44. The apparatus as set forth in claim 42, wherein the number of the moving body detection sensors is 2 to 4.

45. The apparatus as set forth in claim 41, wherein the control means is connected to a plurality of sensor sets each having the plurality of moving body detection sensors so as to integrally control the plurality of sensor sets.

* * * * *